United States Patent [19]

Porter et al.

[11] Patent Number: 5,775,450
[45] Date of Patent: Jul. 7, 1998

[54] VEHICLE UNDERHOOD COMPONENT COOLING SYSTEM

[75] Inventors: Donald Kevin Porter, Olivet; Mark Eugene Franchet, Grosse Pointe Park, both of Mich.

[73] Assignee: General Motors Corporation, Detroit, Mich.

[21] Appl. No.: 642,990

[22] Filed: May 6, 1996

[51] Int. Cl.⁶ .................................................. B60K 11/00
[52] U.S. Cl. .................................. 180/68.1; 180/68.2
[58] Field of Search ................................ 180/68.1, 68.2, 180/68.4, 68.6; 165/41

[56] References Cited

U.S. PATENT DOCUMENTS

| | | | |
|---|---|---|---|
| 4,065,170 | 12/1977 | Fabian | 180/54 A |
| 4,610,326 | 9/1986 | Kirchweger et al. | 180/68.1 |
| 4,662,822 | 5/1987 | Foeldesi | 180/68.1 |
| 4,940,100 | 7/1990 | Ueda | 180/68.1 |
| 5,113,819 | 5/1992 | Murakawa et al. | 123/198 E |
| 5,495,909 | 3/1996 | Charles | 180/68.1 |
| 5,588,482 | 12/1996 | Holka | 165/44 |
| 5,590,624 | 1/1997 | Emond | 180/68.1 |

OTHER PUBLICATIONS

Ser. No. 08/539,575, Khoury et al., Oct. 1995.

*Primary Examiner*—Robert J. Oberleitner
*Assistant Examiner*—C. T. Bartz
*Attorney, Agent, or Firm*—Patrick M. Griffin

[57] ABSTRACT

A specially designed deflector is mounted to the radiator cooling fan assembly, so as to catch and redirect some of the air that has been pulled through the radiator, up and over the engine, between the top of the engine and the underside of the hood. On the underside of the hood, an elongated, hollow curb divides up the space between the underside of the hood and the top of the engine. The curb has a front end located above and to the outside of the deflector, and runs diagonally across the hood underside to a back end that is located to the outside of the alternator. The air is directed along the side of the curb and ultimately over the alternator, thereby cooling it.

3 Claims, 4 Drawing Sheets

VEHICLE UNDERHOOD COMPONENT COOLING SYSTEM

This invention relates to cooling of vehicle underhood components in general, and specifically to a system for redirecting a portion of the otherwise exhausted radiator cooling fan air to cool an underhood component.

BACKGROUND OF THE INVENTION

A two fold trend in vehicle design is the continuing decrease in "underhood" engine compartment volume that results from more streamlined design, coupled with an increase in the number and complexity of engine and vehicle components located in the engine compartment, such as computer control modules and pollution controls. This leads to increased engine compartment crowding and, with it, an increase in underhood temperatures that may reduce the efficiency of certain components, such as the battery and alternator. The alternator, for example, experiences a significant decrease in electrical output with elevated temperature, and therefore would potentially have to be sized larger than it would be if it were possible to provide a cooler running environment.

Known solutions to the problem of underhood heat generally are impractical for an active underhood component, such as an alternator, and especially in an already crowded space that cannot absorb new, bulky structures, and for which a significant redesign and relocation of existing components is not practical. One obvious solution is simply to shield or surround components with an insulated box. This has been done for batteries, for example, to isolate them from hot underhood air. This is not practical for a large, hot running component such as an alternator, since it needs active air cooling, and boxing it in would only raise its running temperature. Another approach, as disclosed in U.S. Pat. No. 4,610,326 issued Sep. 9, 1986 to Kirchweger et al. is to provide ram air through a dedicated underhood duct that opens at a front end through the grill area of the vehicle body, and at a back end to or near the component to be cooled. Such a duct requires space that may not be available, especially in the grill area, which is also growing smaller along with lowered, streamlined hood lines. More significant, such a system does no good at idle or low vehicle speeds, when there is no significant vehicle motion. Alternators tend to run hottest at just such times. Other approaches have involved a substantial relocation and redesign of the underhood components, including the relocation of the radiator cooling fan and the location of the cooling air inlet. For example, U.S. Pat. No. 5,113,819 issued May 19, 1992 to Murakawa et al. which discloses a lawn tractor, uses the cooling fan to cool several other underhood components, such as an oil cooler. This is accomplished by moving the cooling fan from the grill to just under the hood, pointing down. Then, a separate ductwork is built around the downward pointing fan to draw intake air from an inlet located behind the steering wheel, actually facing the driver. Hot underhood components, such as the oil cooler, are located within the newly created inlet air duct so as to be actively cooled by the air stream from the relocated cooling fan. Such a radical redesign and relocation of the cooling fan and the air inlet would be impossible with passenger automobiles, with their limited space between the hood and the top of the engine, and with enclosed passenger cabins.

SUMMARY OF THE INVENTION

The invention provides a system for actively cooling an underhood alternator with a portion of the otherwise exhausted cooling fan air, which does not require the redesign or relocation of the fan or the fan air inlet, which does not require the use of dedicated ram air inlet area in the grill or elsewhere, and which does not require the addition of any enclosed underhood ductwork.

In the preferred embodiment disclosed, a dual cooling fan assembly is mounted behind the grill and the vehicle radiator and just in front of the engine. Air pulled through the radiator by the fan assembly is normally exhausted back and down, out of the engine compartment. The vehicle alternator is located above and behind the engine, well out of the normal exhausted fan air stream. Given the vehicle design, there is limited space available between the undersurface of the hood and the top of the engine, and essentially no additional air inlet space available at the front of the vehicle, which is taken up entirely by the grill.

The invention provides an active cooling system for the alternator that works within these given limitations. In the embodiment disclosed, a specially designed deflector is mounted to the fan assembly, in front of the engine, so as to catch and redirect some of the air that has been pulled through the radiator. This air, rather than being exhausted beneath the engine, is redirected up and over the engine, between the top of the engine and the underside of the hood. Fixed to the underside of the hood is an elongated curb, which divides up the space between the underside of the hood and the top of the engine, but not in a completely air tight fashion. The curb has a front end located above and to the outside of the deflector, and runs diagonally across the hood underside to a back end that is located to the outside of the alternator. The deflected air does not enter the interior of the curb, as with a duct, but is instead deflected along the side thereof, to and ultimately over the alternator, thereby cooling it.

Therefore, a minimum of additional structure is added to the vehicle, and no existing structure is moved or changed. No additional space, volume or air inlet area is required. Cooling air is provided to the alternator at all times, air that would otherwise go un-utilized, even when the vehicle is idling and stopped.

DESCRIPTION OF THE PREFERRED EMBODIMENT

These and other features of the invention will appear from the following written description, and from the drawings, in which.

Figure 1:
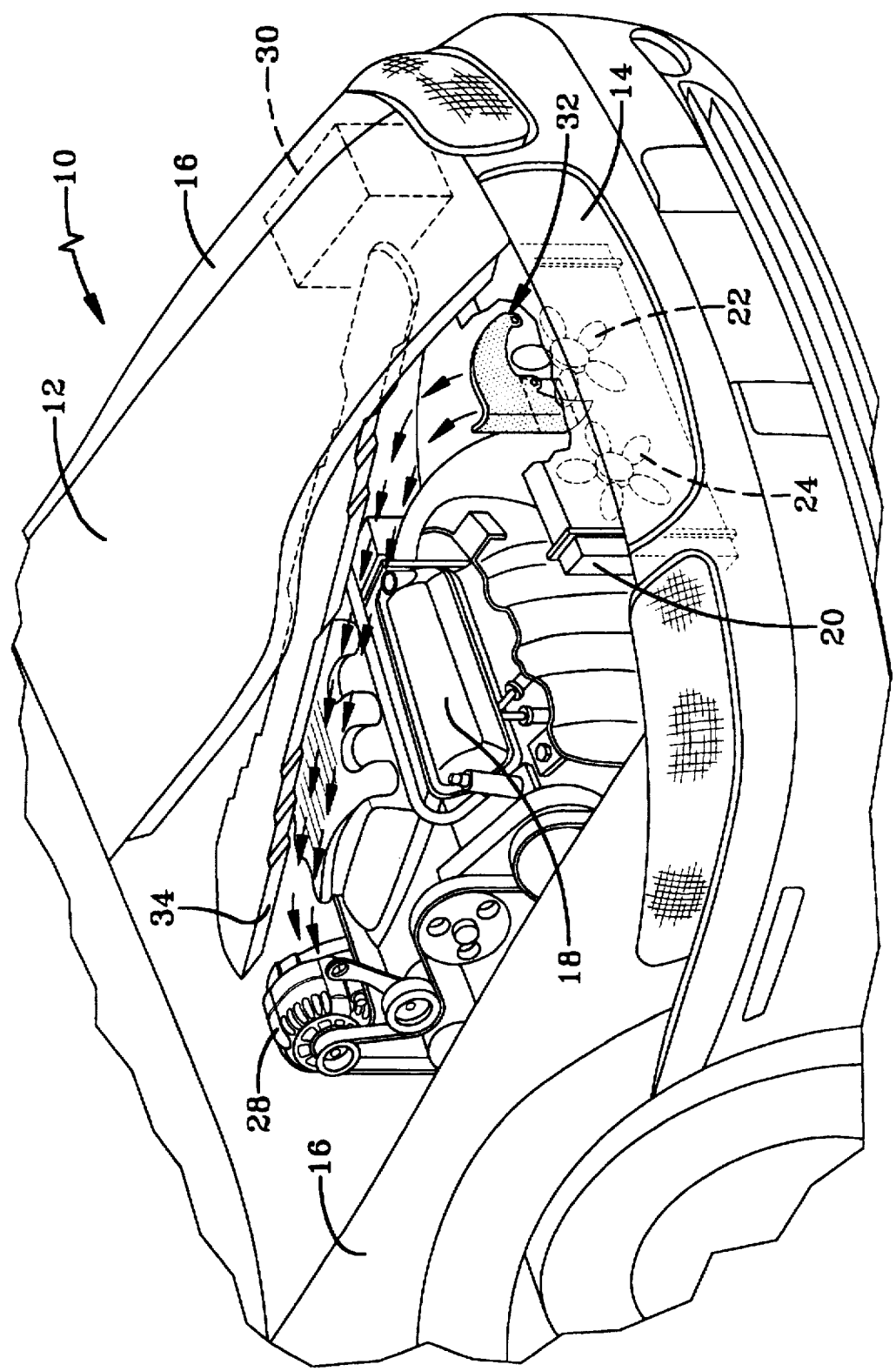
FIG. 1 is a perspective view of the front of a vehicle with the hood partially broken away to reveal the engine compartment and a preferred embodiment of the invention.
Figure 2:
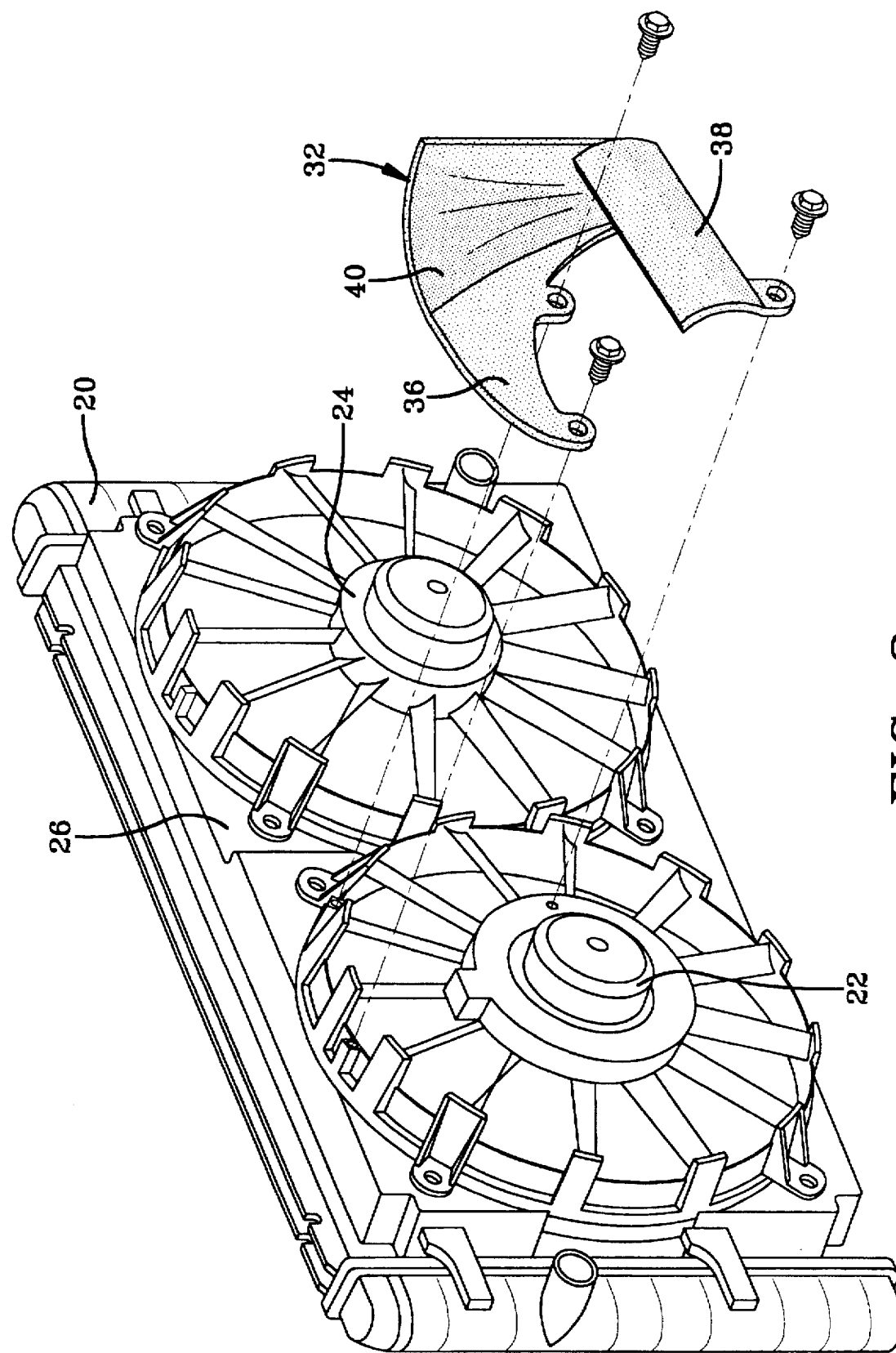
FIG. 2 is a perspective view of the back of a fan assembly with the deflector shown in a disassembled position.
Figure 3:
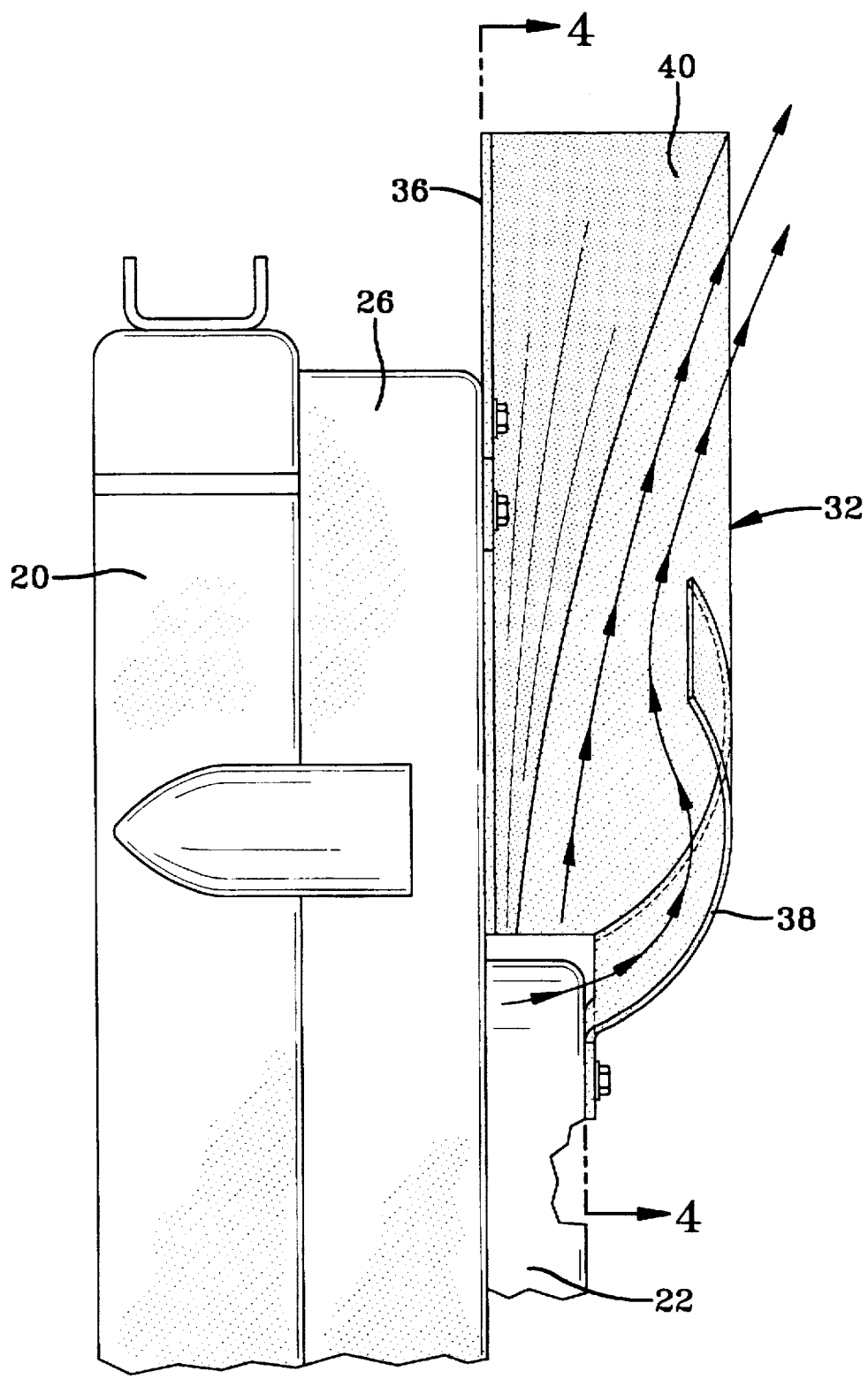
FIG. 3 is a side view of the deflector mounted to the fan assembly.
Figure 4:
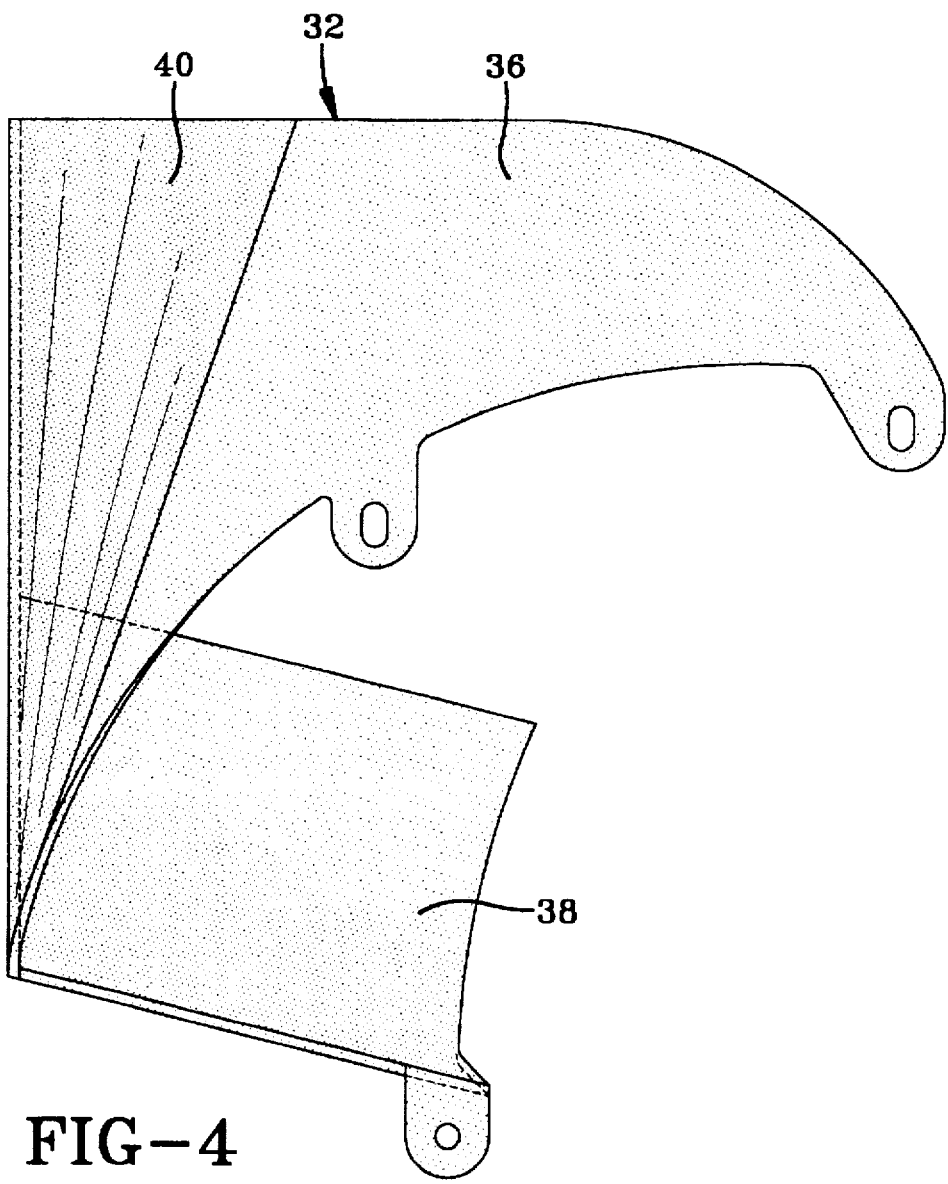
FIG. 4 is a view of the back of the deflector taken from the perspective of the line 4—4 of FIG. 3.
Figure 5:
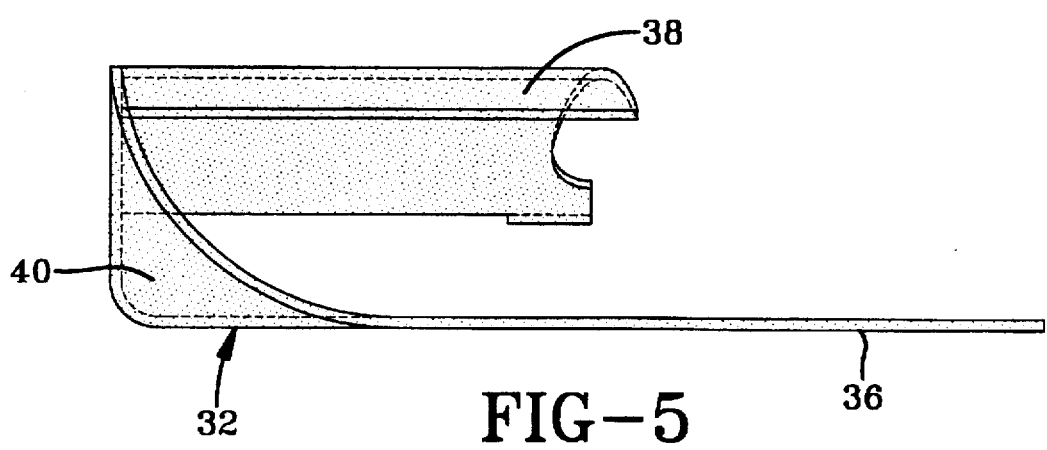
FIG. 5 is a top view of the deflector.

Referring first to FIGS. 1 and 2, a vehicle indicated generally at 10 has an engine compartment generally defined at the top by a hood 12, at the front by a grill 14, and on the sides by fenders 16. Hood 12 is low and sloped, for aerodynamic advantage and, as a consequence, grill 14 is limited in frontal area. An engine 18 mounted in the compartment sits just beneath hood 12 and behind grill 14. A conventional engine cooling radiator 20 is mounted between grill 14 and the front of engine 18. Mounted to- and behind radiator 20 is a fan assembly which, in the embodiment disclosed, consists of two side by side cooling fans 22 and 24. Two side by side circular fans gives a better utilization of the rectangular space available behind radiator 20, as compared to one large fan. The fans 22 and 24 are both mounted by and to a rectangular, molded plastic cowl 26, which has circular openings through which each turns. The fans 22 and 24 rotate counterclockwise (using the directional reference frame of a viewer on the outside of vehicle 10 facing the grill 14). Of the two, the fan 22 that sits on the right is significantly more powerful, for several reasons. It is closest to the inlet to the radiator 20, where the temperature is the greatest, and a deliberate mismatch in the fan power prevents interference between the two air streams, known as beating. Air pulled through grill 14 and radiator 20 has a speed and direction that is mostly axially straight back, plus a counterclockwise spiral component, and has been found to have a temperature of about 200 degrees F. It would normally be exhausted into and beneath the engine 18, and very little would flow above the engine 18. The small volume of exhausted fan air which does flow above and over the top surface of engine 18 has been found to have a relatively low air speed, approximately 0.8 meters per second. The upper surface of engine 18 has a temperature on the order of 220 degrees F. or more, and air passing that slowly over it can be significantly warmed. Other components found beneath hood 12 include a conventional alternator 28 and battery 30, whose location is shown schematically. Alternator 28 is located above and behind engine 18, on the far left side (or passenger side) of the engine compartment, significantly distant from the fans 22 and 24. Alternator 28 runs at around 250 degrees F., although it is potentially more efficient if it can be made to run cooler. The volume of fan air that reaches it is not great enough to significantly cool it. Battery 30 is located quite near the fans 22 and 24, on the far right or driver side of the compartment, but it operates best at less than 150 degrees, so its proximity to fan 22 is not an advantage. Because of the limited size of grill 14, essentially all the air that can be pulled through it is needed for radiator 20, and there is no available area for the presence of dedicated air inlets or ducts to provide ram air for cooling alternator 28, battery 30 or any other underhood component. The invention works within all of these various space limitations, pre existing component locations and temperatures without any radical re designs or re locations. Only two additional components are incorporated, a deflector indicated generally at 32, and an elongated curb 34.

Referring next to FIGS. 2 through 5, deflector 32 is an integral molded plastic piece that is specially designed to work in conjunction with the exhausted air flow from the back of fan 22. In terms of size and location, deflector 32 fits into the 9 to 12 o'clock quadrant of the circle subtended by fan 22 (as viewed from the perspective of FIG. 1), and between the cowl 26 and engine 18, within space that is already available. Deflector 32 has three basic structural elements, a mounting flange 36, a deflecting blade 38, and a slightly curved pocket 40 interconnecting the flange 36 and blade 38. Flange 36 is basically flat, with a curved inner edge that surrounds the circular opening in cowl 26, without blocking the fan 22. Flange 36 is bolted to cowl 26 as shown, and no significant design change need be made to cowl 26, apart from providing bolt holes. The deflector blade 38 is upwardly curved, and sits below and axially spaced from the flange 36, so that it is put in a position where some of the exhausted air flow through the noted quadrant of the fan 22 will hit it. The blocked air is deflected forcibly upwardly by the curvature of the blade 38. In addition, it will be recalled that the air pulled through fan 22 has a spiral, counterclockwise component, although its main force is axially back. The pocket 40 is properly positioned so as to catch and confine the spiraling component of the exhausted fan air, adding it to the stream that is being forcibly deflected upwardly by the curved blade 38, as shown by the arrows in FIG. 3. The portion of the exhausted air through fan 22 that is so deflected is directed generally upwardly and over the top of engine 18 and below hood 12. As such, however, it would have little chance of reaching alternator 28. Curb 34 cooperates with deflector 32 to complete the necessary air flow, as is described next.

Referring next to FIG. 1, curb 34 is a hollow member, molded of fiberglass cloth or similar material that is lightweight and heat resistant. It is fixed to the underside of hood 12, and runs diagonally across as shown, between the alternator 28 and battery 30. More specifically, the front end of curb 34 is located above and to the right side of defector 32 (and to the left of battery 30), while the back end is located on the right side of alternator 28. Curb 34, while basically straight, is somewhat irregularly shaped in terms of width and thickness. This is done so that it will block off the space between the underside of hood 12 and the top of engine 18 as completely as possible, while clearing various obstacles, and the underhood space is not a constant depth. Basically, however, the left side of curb 34 is straight, and the various transitions in its width are chamfered so as avoid abrupt discontinuities in the side surface. As indicated by the arrows in FIG. 1, air that is diverted by deflector 32 is confined and directed by the side of curb 34 diagonally across the top of engine 18 (and under hood 12) toward the alternator 28. As such, curb 34 does not act like a duct, nor is it intended to, since it can confine and direct a larger volume of air more efficiently with its side surface than it could inside it's hollow interior. The air so directed ultimately washes through and over alternator 28, cooling it significantly. Measurements have shown that the air speed of the deflected air stream is approximately 3 meters per second, significantly greater than the naturally occurring air flow. The greater speed also means that the deflected air flow will pick up less heat from the top of engine 18 during its travel. This cooling air flow is available when the vehicle idles, and has little or no forward motion, unlike ram air scoops and ducts. In addition, curb 34 keeps air flow away from the cooler running battery 30, and the dead air space within curb 34 acts to shield and insulate battery 30 from heat transfer in general.

Variations in the disclosed embodiment could be made. For example, if only one cooling fan existed, and if the component that required cooling were located elsewhere, then the location and direction of the curb 34 would differ, running straight, or at a different angle. It would always act to at least-partially close off the space between the underside of the hood and the upper surface of the engine, however, and would also be located on the same side of the deflector 32 and whatever component it was desired to cool, so that it would be capable of properly directing the diverted air. The deflector 32 could have a different shape depending on the direction of rotation of the cooling fan. In a two fan cooling system, the deflector 32 might go on the other fan (24), if it were the more powerful of the two in a different vehicle, or if it were somehow better situated so as to feed deflected air to the particular component that needed cooling. In the embodiment disclosed, even through the other fan 24 is in fact closer to the alternator 28, attempts to direct its air flow to the alternator 28 from it with a shorter and more directly extending curb were not satisfactory. Even though fan 22 is more distant and the diagonally extending curb 34 consequently relatively longer, that arrangement was found to work better. Curb 34 could have the same basic hollow shape shown, but be formed more integrally to the undersurface of the hood 12. For example, it could be an integrally molded part of the so called "hood blanket," which is a separate insulating layer that is mounted to the under side of the hood. Or, curb 34 could be a separate piece of different configuration, such as a solid, thin wall or flange, rather than the hollow and relatively wider trough shape shown. The hollow shape is particularly useful, even though it does not operate as a hollow duct, since it has the dead air space within that can also insulate underhood components that are located on the side of the engine compartment opposite to the component that needs cooling. Therefore, it will be understood that it is not intended to limit the invention to just the embodiment disclosed.

We claim:

1. In a vehicle having an engine contained in an engine compartment enclosed by a hood located above said engine, a radiator located-in said in front of said engine, and having a cooling fan assembly mounted behind said radiator that pulls outside air into said compartment and through said radiator and which normally exhausts said cooling air in a stream generally toward and beneath said engine, and in which a component that runs hotter than said exhausted air is located generally above said engine and out of the normal path of said exhausted air, a system for redirecting a portion of said exhausted air toward and over said component, comprising, a deflector mounted behind said fan assembly and adapted to catch and redirect at least a portion of said exhausted air stream up and over said engine, beneath said hood, and, an elongated curb mounted beneath said hood and above said engine and extending continuously from a front end located above and to the side of said deflector to a back end located to the same side of said component, whereby exhausted air redirected by said deflector from said fan assembly and above said engine is thereafter directed by said curb along the outside of said curb toward and generally over said component, thereby cooling it.

2. In a vehicle having an engine contained in an engine compartment enclosed by a hood located above said engine, a radiator located in front of said engine, and having a circular cooling fan with a predetermined direction of rotation mounted behind said radiator that pulls outside air into said compartment and through said radiator and which normally exhausts said cooling air in a stream generally toward and beneath said engine, and in which a component that runs hotter than said exhausted air is located generally above said engine and out of the normal path of said exhausted air, a system for redirecting a portion of said exhausted air toward and over said component, comprising, a deflector mounted behind said fan, said deflector having an upwardly curved blade positioned in said exhausted air stream so as to catch and redirect at least a portion thereof up and over said engine, beneath said hood, and, an elongated curb mounted beneath said hood and above said engine and extending continuously from a front end located above and to the side of said deflector to a back end located to the same side of said component, whereby exhausted air redirected by said deflector from said fan assembly and above said engine is thereafter directed by said curb along the outside of said curb toward and generally over said component, thereby cooling it.

3. In a vehicle having an engine contained in an engine compartment enclosed by a hood located above said engine, a radiator located in front of said engine, and having a cooling fan assembly mounted behind said radiator that pulls outside air into said compartment and through said radiator and which normally exhausts said air in a stream generally toward and beneath said engine, and in which a first component that runs hotter than said exhausted air is located generally above said engine on one side of said compartment and out of the normal path of said exhausted air, and in which a second component that runs cooler than said exhausted air stream is located on the other side of said compartment, a system for redirecting a portion of said exhausted air toward and over said first component, comprising, a deflector mounted behind said fan assembly and adapted to catch and redirect at least a portion of said exhausted air stream up and over said engine, beneath said hood, and, an elongated curb mounted beneath said hood and above said engine, between said first and second components, and extending continuously from a front end located above and to the side of said deflector to a back end located to the same side of said first component, whereby exhausted air redirected by said deflector from said fan assembly and above said engine is thereafter directed by said curb along the outside of said curb toward and generally over said first component, thereby cooling it, while said second component is isolated from said exhausted air.

* * * * *